Patented Aug. 2, 1949

2,477,639

UNITED STATES PATENT OFFICE 2,477,639

PROCESS OF ACTIVATING KAOLIN CLAY

George Alexander Mills, Swarthmore, Pa., assignor to Houdry Process Corporation, Wilmington, Del., a corporation of Delaware No Drawing. Application October 4, 1947,
Serial No. 778,037

13 Claims. (Cl. 252—450)

The present invention relates to processes for improving the useful properties of catalysts employed in hydrocarbon conversion processes and is particularly applicable to catalysts derived from or containing kaolin clays as active constituents thereof.

Active hydrocarbon conversion catalysts chiefly employed in present commercial processes, derived from naturally occurring hydrosilicates of alumina, are those prepared from selected types of clay of the montmorillonite group, such as the sub-bentonites, which are brought to desired activity by acid treatment in known manner. Although other common and abundant clays such as kaolin clays, had been suggested for use as catalysts in hydrocarbon conversion processes, these latter clays have not found commercial acceptability because of their comparatively poor catalytic activity. These kaolin clays and other comparatively inert or fairly inactive naturally occurring hydrosilicates of alumina, when acid treated in their raw state characteristically demonstrate only minor increase in catalytic activity, generally short of that rendering these materials feasible for economic commercial operations.

In a copending application, Serial No. 764,559, filed July 29, 1947, certain methods are described for the preparation from kaolin clays of active hydrocarbon conversion catalysts having improved properties including enhanced steam stability. The treatment therein disclosed involves subjecting the kaolin clays to the action of water in the liquid state at temperatures in the range of 250 to 700° F. and at pressures at and above that necessary to maintain the water in liquid phase. As a result of the treatment, the obtained catalyst becomes more resistant to deactivation by steam, and other useful properties of the clay are improved such as activity and/or physical properties including hardness and density.

Treatment of some raw kaolin clays, as with mineral acid, in certain instances has been found to effect some increase in activity, but still considerably short of the levels obtained starting with sub-bentonite clays. In addition quite often even this minor increase in activity is accomplished only at the expense of accompanying sacrifice of other important properties of the clay such as decreased stability of catalyst activity particularly in the presence of steam at high temperature with or without impairment or other physical properties such as density, hardness, plasticity, etc. The process described in the copending application above referred to, therefore, provides beneficial and important improvements in the properties of kaolin clays, particularly in the enhanced steam stability of the catalysts produced therefrom.

I have found that by subjecting kaolin clays to a high pressure hot water treatment, such as described in their prior application referred to, and to a subsequent acid treatment, important improvements particularly in the catalytic properties of these clays, can be obtained. The acid leaching can be controlled to obtain catalytic products of increased activity, as evidenced by the production from a hydrocarbon charge stock of comparatively large quantities of desired liquid products such as gasoline and commercially valuable gaseous hydrocarbons. By more extensive acid treatment following the hot water treatment the selectivity of the catalysts may be further improved, particularly as measured in terms of the ratio of the quantity of gasoline produced from cracking of a hydrocarbon oil to the quantity of carbonaceous matter ("coke") deposited. Moreover the high activity of these kaolin catalysts is well retained over long periods of use as evidenced by their high degree of steam stability.

The acid treating step designated need not be the only treatment given the clay following the high pressure hot water treatment, as other beneficiating treatments may also advantageously be employed therewith, as will hereinafter appear. Furthermore, the acid treatment of the present invention obtains its characteristic effect whether or not the clay has received a previous acid treatment prior to the high pressure hot water treatment.

In the practice of the invention, the clay should be fairly cool when subjected to the prescribed acid treatment, it being preferred that the acid treatment, particularly during the early stages, be effected at moderate temperatures, such as at room temperatures or not generally above about 120° F. After the clay has been leached with the cool acid for some time, the temperature of the leaching may be increased to 140–150° F. and even higher up to about the boiling point of the acid. With increasing temperature the duration of the acid treatment should be limited so as not to remove exceedingly large amounts of alumina from the clay.

Although organic acids may be employed, particularly those organic acids forming soluble metallic complexes, such as the hydroxy carboxylic acids, as well as the more highly ionized organic acids such as acetic or formic acids, from the standpoint of time and economy it is preferred to employ a strong mineral acid such as hydrochloric or sulfuric acid. These acids should be employed in fairly dilute aqueous concentrations such as 5 to 20% hydrochloric or 10 to 30% sulfuric (weight of acid in aqueous-acid mixture). Notable improvement in activity or desired selectivity of the catalysts is already evidenced when the high pressure hot water treated clay is contacted with acids at room temperature, such as with 15% hydrochloric acid for about 8 hours, with further progressive improvement of the catalysts being obtained as the acid treatment is extended to 24 or more hours. As the duration of the acid treatment is increased beyond about 72 hours, the degree of additional improvement effected in the catalytic properties of the clay is generally less pronounced.

The kaolin clay subjected to acid treatment as described is one which has already received a high pressure hot water treatment, which treatment may be carried out as described in the copending application referred to. Thus the clay may be subjected to a temperature lying in the range of between about 250° F. and the critical temperature of water (705.2°), the preferred range lying between 300 to 600° F., and the treatment is carried out under a pressure within the range of about 100–2000 lbs. per sq. in., but at least sufficient to maintain the water in the liquid phase. The high pressure hot water treatment obtains its maximum effects under these conditions during a period of about 1 to 72 hours, about 5 to 25 hours being preferred. The clay initially subjected to the high pressure hot water treatment may be a raw clay in finely divided form or in the form of granules or agglomerated particles or preformed masses such as pellets or the like. Preferably, however, the clay should be calcined, in vacuo or in the presence of air or an inert gas such as nitrogen, at a temperature of 800 to 1700° F., preceding the hot water treatment. When the clay treated is in the form of pellets or agglomerated masses and has been calcined, the form will be retained during the subsequent hot water treatment as well as during the prescribed acid treatment which follows. As indicated above, in addition to the acid treatment following the hot water treatment, the clay may also receive an acid treatment prior or subsequent to the calcination; but this treatment will not replace or obtain the desired effects of the prescribed acid treatment following the hot water treatment.

Catalysts of exceptionally high activity and possessing additional beneficial properties may be obtained from kaolin clays, if the sequence of treatments includes subjecting the clay at high temperatures to an active gas or vapor capable of reacting with iron present in the clay to convert the iron to acid soluble iron salts. The acid soluble iron salts thus formed are largely removed from the clay by the acid treatment in accordance with the invention. Thus, a kaolin clay may be subjected to treatment with a sulfiding gas, such as hydrogen sulfide, at a temperature in the range of 1200 to 1600° F. before or after being subjected to the high pressure hot water treatment, preferably after, and subsequently treated with acid, as described, after the hot water treatment. Full details for carrying out the treatment with reactive gas are disclosed in a copending application Serial No. 644,422, filed January 30, 1946 (now U. S. Patent No. 2,466,047), in which I am a joint inventor. Any of the treatments with reactive gas described in the earlier application may be employed as a step in the sequence of the present invention.

The processes of the invention are not limited to clays or catalysts consisting solely of kaolin, but may also be applied to composite contact masses containing in addition to the kaolin, minor proportions of montmorillonite clay whether or not in acid-activated form, or synthetic gel materials such as silica-alumina or the like.

The catalysts prepared in accordance with the invention may be and preferably are given a conventional final calcination or preconditioning heat treatment to fix their activity as by treatment in air or steam or mixtures of these, before their being charged to a hydrocarbon conversion system, or such finishing treatment may be omitted and the catalyst permitted to reach its stable activity incident to the temperatures encountered during use in such system.

In the following tables and examples the activity of the catalysts is designated in terms of the volume percent of gasoline obtained on cracking of a standard charge stock under conditions of the CAT-A method, described by J. Alexander and H. G. Shimp in National Petroleum News, Technical Section, August 2, 1944; beginning at page R537. In accordance with the described method, a light East Texas gas oil is contacted with the catalyst at a temperature of approximately 800° F. under superatmospheric pressure and at a liquid space rate of 1.5 (volume charge/volume of catalyst/per hour) for a ten minute operation period. The volume of gasoline of 410° F. cut point is measured and expressed as a percentage of the volume of oil charged, thereby designating the characteristic activity of the catalyst. In addition, the quantity of carbonaceous deposit formed in the catalyst is also usually measured and expressed in terms of weight percent of charge, and the specific gravity and weight percent of gas produced is also determined.

The terms "kaolin" or "kaolin clay" as herein employed include those clays which in the raw uncalcined state contain as the principal clay mineral constituent present therein, kaolinite, halloysite, indianaite, dickite, nacrite or anauxite. These clay minerals are all hydrous aluminum silicates in their uncalcined form and may be represented by the formula $$Al_2O_3 \cdot 2SiO_2 \cdot nH_2O$$

$n$ being generally 2. The indicated formula gives a weight ratio of $SiO_2/Al_2O_3$ of about 1.16 and the various naturally occurring clays of the invention generally fall within a $SiO_2/Al_2O_3$ of about 1.0 to about 1.5.

EXAMPLE I (a) A kaolin clay from the Eccles property in Putnam County, Florida, was pelleted raw and then calcined in air at 1050° F. for 2 hours. The raw clay had the following analysis by weight on an ignited basis (containing about 20% by weight sand):

| | |
|---|---|
| $SiO_2$ | 65.8 |
| $Al_2O_3$ | 32.4 |
| $Fe_2O_3$ | 1.4 |
| $CaO$ | 0.23 |
| $MgO$ | 0.21 |
| $SiO_2$ | 0.69 |

(b) The calcined clay pellets were then treated in a sealed bomb with water maintained in liquid state under pressure at a temperature of 450° F. for 24 hours, removed from the bomb and further treated for 2 hours at 1500° F. with a sulfiding gas comprising 75% nitrogen and 25% $H_2S$, cooled to room temperature and leached with 15% aqueous hydrochloric acid for 72 hours.

(c) One portion of the leached pellets was conditioned to stable activity by treatment for ten hours at 1400° F. in air containing 5% steam (by volume) and employed for cracking of standard light gas oil under conditions of the CAT-A method. Another portion of the acid leached pellets was subjected to drastic steaming in 100% steam for 4 hours at 1350° F., and then employed for cracking light gas oil under the same conditions as the preceding pellets. The results of these cracking runs are given in Table 1 below.

(d) Another portion of the acid leached pellets from (b) above was further leached with 15% HCl for 24 hours at 140° F., and portions of the thus treated pellets tested for cracking activity and steam stability as above. The results are shown in the following table:

Table 1

|  | CAT-A Yields | | | |
|---|---|---|---|---|
|  | Gaso., Vol. Per Cent | Coke, Wt. Per Cent | Gas, Wt. Per Cent | Gas Grav. |
| (c) { 72 hr. acid leached pellets, after treat in 5% steam | 43.3 | 5.5 | 13.3 | 1.53 |
| 72 hr. acid leached pellets after treat in 100% steam | 35.9 | 3.5 | 7.4 | 1.54 |
| (d) { 72+24 hr. acid leached pellets after treat in 5% steam | 45.5 | 5.5 | 13.2 | 1.64 |
| 72+24 hr. acid leached pellets after treat in 100% steam | 36.4 | 2.6 | 7.0 | 1.57 |

The activities of the catalysts (after 5% steam treatment) are as high or higher than that of the best silica-alumina commercial synthetic catalysts or that of clay catalysts of the acid-activated sub-bentonite type. Moreover, the test for stability to high temperature steam, a measure of stability of catalyst in operation, is shown to be considerably higher than that obtained with commercial synthetic or clay catalysts. The bulk density, heat capacity, and hardness are much higher than those of commercial synthetic or clay catalysts which are distinct advantages in controlling the temperature and losses due to breakage. The high specific gravity of the fixed gas indicates the presence of large amounts of valuable constituents such as $C_3$ and higher hydrocarbons, which products can be economically recovered for desired useful purposes. It will also be seen from the above table that by more extensive acid treatment after the bomb treatment, the gasoline/coke ratios of the catalyst can be further improved.

EXAMPLE II

Pellets of the same raw kaolin clay as in the preceding example were calcined in air at 1050° F. for 2 hours, then subjected to bomb treatment with liquid water at 450° F. for 24 hours. After cooling to room temperature, the hot water treated pellets were leached with 15% HCl for 24 hours. Tested by the CAT-A method after 5 and 100% steam treatment respectively, as indicated, the following results were obtained:

Table 2

| Bomb treated and acid leached Eccles clay | CAT-A Yields | | | |
|---|---|---|---|---|
|  | Gaso, Vol. per-cent | Coke, Wt. per-cent | Gas, Wt. percent | Gas Grav. |
| 5% steam treated | 39.5 | 6.6 | 14.6 | 1.44 |
| 100% steam treated | 38.1 | 4.8 | 10.7 | 1.47 |

EXAMPLE III

In this example the clay treated was a halloysite from Eureka, Utah, having substantially the following composition on a dry (105° C.) basis:

Weight percent
Ign. loss --- 
Si as $SiO_2$ ------ 42.9
Al as $Al_2O_3$ ------ 43.2
Fe as $Fe_2O_3$ ------ 0.3
Na as $Na_2O$ ------ .05
Ca as CaO ------ .13
Mg as MgO ------ .08
K as $K_2O$ ------ .09

This clay has a typical CAT-A activity in the raw state of about 29 to 30% by volume gasoline and was not activated beyond this activity by treatment in the raw state with 20% $H_2SO_4$ (.40 acid per unit weight of clay) for eight hours at 93° C.

(a) The above raw halloysite clay was pelleted and calcined in air at 1050° F. for 2 hours, then treated with hot water in liquid state at 450° F. for 24 hours followed by acid leaching at room temperature with 15% aqueous HCl for 72 hours.

(b) One portion of the acid leached pellets was then heat treated at 1400° F. for 10 hours in the presence of 5% steam and 95% air (by volume) and another portion treated with 100% steam at 1350° F. for 4 hours. The heat-treated catalyst pellets were tested by the CAT-A method with the following results:

Table 3

| Bomb treated+acid leached halloysite | CAT-A Yields | | | |
|---|---|---|---|---|
|  | Gaso., Vol. Per Cent | Coke, Wt. Per Cent | Gas, Wt. Per Cent | Gas Grav. |
| 5% steam treated | 39.0 | 9.4 | 21.0 | 1.29 |
| 100% steam treated | 38.1 | 5.6 | 14.2 | 1.30 |

The above results of the 5% steam treated catalyst, amounting to almost 70% conversion of the refractory charge stock employed, are exceptional as compared with known cracking catalysts.

EXAMPLE IV

In this example the kaolin clay treated was from the Edgar clay mines in Putnam County, Florida, having the following analysis on a dry (105° C.) basis:

Parts by weight
Ign. loss ------ 12.9
Si as $SiO_2$ ------ 46.6
Al as $Al_2O_3$ ------ 38.8
Fe as $Fe_2O_3$ ------ 1.0
Ca as CaO ------ 0.44
Mg as MgO ------ 0.23
Na as $Na_2O$ ------ 0.52
Ti as $TiO_2$ ------ 0.35

This kaolin clay has a typical activity by the CAT-A method in the raw state (or after air calcination at 1050° F.) of 10–15% gasoline.

The raw Edgar clay was pelleted and calcined in air at 1050° F. for 2 hours. The calcined pellets were then treated with 15% HCl at room temperature for 24 hours followed by a bomb treatment in liquid water at 450° F. for 10 hours. The thus treated pellets were then treated with hydrogen sulfide at 1400° F. for 2 hours and again leached with 15% HCl at room temperature this time for 72 hours.

One portion of the obtained pellets was then calcined in air at 1050° F. for 2 hours, another portion with 100% steam for four hours at 1350° F. The heat treated catalyst when tested by the CAT-A method gave the following yields.

Table 4

| Catalyst from Edgar clay (Example IV) | CAT-A Yields | | | |
|---|---|---|---|---|
| | Gaso., Volume Percent | Coke, Weight Percent | Gas, Weight Percent | Gas Grav. |
| After air calcination | 36.1 | 4.3 | 9.4 | 1.63 |
| After 100% steam treat | 27.8 | 1.9 | 3.3 | 1.53 |

In the use of the catalysts according to the present invention no change in usual conditions of treatment of the hydrocarbon to be processed is rendered necessary. The usual conditions as to time, temperature, etc. can be followed if desired. As an example of a fixed bed operation, cracking may be carried out at a temperature of 800° F. to 950° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 8, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In the processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

Catalysts with which the invention is concerned also find use in synthesis reactions, for example, polymerization of gaseous hydrocarbons to liquid products.

Obviously many modifications and variations of the invention as hereinbefore set forth may be made without departing from the spirit and scope thereof and, therefore, only such limitations should be imposed as are indicated in the appended claims.

I claim as my invention:

1. The process of preparing catalysts of improved steam stability from kaolin clay, which comprises treating a calcined kaolin clay with water for at least 15 minutes at a temperature in the range of 250° F. and below the critical temperature of water and under a pressure at least sufficient to maintain the water in liquid phase at the treating temperature, and subsequently acid leaching the clay.

2. The process in accordance with claim 1 in which the calcined kaolin clay subjected to the defined water treatment is in pelleted form.

3. The process of preparing active catalysts of improved steam stability from kaolin clays, which comprises calcining a raw kaolin clay, subjecting the calcined clay for at least fifteen minutes to an atmosphere in which water is maintained in liquid phase and at a temperature of at least 250° F. under pressure sufficient to maintain the water in liquid phase, and subsequently leaching the clay with dilute acid under mild temperature conditions.

4. The process in accordance with claim 3 wherein the defined atmosphere in which water is maintained in liquid phase comprises temperatures in the range of about 300° to 600° F. and corresponding pressures at least sufficient to provide water in the liquid phase.

5. The process in accordance with claim 3 wherein the clay is subjected to the defined atmosphere for a period of 1 to 72 hours.

6. The process in accordance with claim 3 wherein the clay is subjected to the defined atmosphere for a period of 5 to 25 hours.

7. The process in accordance with claim 3 wherein the acid treatment is continued for at least 24 hours.

8. The process of preparing active hydrocarbon conversion catalysts of improved steam stability from kaolin clays which comprises pelleting a kaolin clay and calcining the pellets, leaching the calcined pellets with dilute mineral acids, then treating the pellets with water in liquid phase for at least one hour at a temperature of about 300° to 600° F. under pressure sufficient to maintain the water in liquid phase and subsequently again leaching the pellets with dilute mineral acid.

9. The process in accordance with claim 8 in which the defined water treatment is carried out at a temperature in the order of 450° F. under pressure of about 500 pounds per square inch gauge.

10. The process in accordance with claim 9 wherein the defined water treatment is continued for a period of about ten hours.

11. The process in accordance with claim 8 wherein the calcining step defined comprises treatment at elevated temperature with sulfiding gas.

12. The process of preparing active hydrocarbon conversion catalysts of improved steam stability from kaolin clays which comprises pelleting a kaolin clay and calcining the pellets, treating the calcined pellets for at least 15 minutes with water in liquid state at a temperature above 250° F. under suitable pressure to maintain the water in liquid state, subjecting the water treated pellets to the action of a sulfiding gas at a temperature in the range of 1200° to 1600° F., and thereafter acid leaching the sulfided pellets.

13. The process of preparing active steam-stable catalysts from kaolin clays which comprises calcining a kaolin clay, subjecting the calcined clay for at least one hour to the action of water in liquid state at a temperature above 250° F. under sufficient pressure to maintain the water in liquid state, then leaching the clay with dilute mineral acid under mild temperature conditions and subsequently calcining the acid treated clay in the presence of steam.

GEORGE ALEXANDER MILLS.

No references cited.

Certificate of Correction

Patent No. 2,477,639                                August 2, 1949

GEORGE ALEXANDER MILLS

It is hereby certified that errors appear in the printed specification of the above numbered patent requiring correction as follows:

Column 4, line 46, before the word "of" insert *ratio*; column 6, line 18, for "20%" read *10%*; column 8, line 32, for "acids" read *acid*;

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*